United States Patent [19]

Sanchez

[11] Patent Number: 5,730,170
[45] Date of Patent: Mar. 24, 1998

[54] EMERGENCY GAS OR FUEL SHUT-OFF DEVICE

[76] Inventor: Robert M. Sanchez, 11574 E. Beverly Blvd., Whittier, Calif. 90601

[21] Appl. No.: 723,752

[22] Filed: Sep. 30, 1996

[51] Int. Cl.⁶ ............................................. F16K 17/38
[52] U.S. Cl. ............................ 137/77; 137/78.4; 137/554
[58] Field of Search .......................... 137/75, 77, 78.4, 137/79, 554

[56] References Cited

U.S. PATENT DOCUMENTS

| | | | |
|---|---|---|---|
| 1,723,593 | 8/1929 | Wilson | 137/77 |
| 1,742,213 | 1/1930 | Murray | 137/77 |
| 2,030,019 | 2/1936 | Bard | 137/77 |
| 2,665,714 | 1/1954 | Greenwood | 137/77 X |
| 3,464,433 | 9/1969 | Michaelsen | 137/77 |
| 3,981,316 | 9/1976 | Sullivan | 137/554 X |
| 4,223,692 | 9/1980 | Perry | 137/78.4 |
| 4,381,100 | 4/1983 | Schoenberg | 137/554 X |
| 4,811,752 | 3/1989 | Lyons et al. | 137/77 |

*Primary Examiner*—John Fox
*Attorney, Agent, or Firm*—Edgar W. Averill, Jr.

[57] ABSTRACT

An emergency fuel shutoff device for interrupting the flow of gas or other fuel to a burner in the event of a malfunction or fire. The device uses a normally closed spring loaded fuel valve which is held open by tension along a cable. The cable has several fusible links along its length. If any of the fusible links melt, the tension in the chain is released and the spring loaded fuel valve closes, shutting off the flow of fuel to the burner. Preferably the device also has a manual shut-off station which has a pull ring which also releases the tension in the cable shutting off the flow of fuel. When the tension in the cable is released a horn or strobe light provides an audible and a visible signal that the fuel valve has been closed. The horn and light are preferably powered by standby batteries.

6 Claims, 2 Drawing Sheets

EMERGENCY GAS OR FUEL SHUT-OFF DEVICE

BACKGROUND OF THE INVENTION

The field of the invention is safety devices and the invention relates more particularly to fire safety. Most industrial facilities include one or more gas or oil fired boilers. Many other industrial processes use gas or oil fired equipment all of which constitute a potential safety hazard. A serious problem arises if the burner malfunctions or a fire starts around the burner in that such fire can also envelope the gas valve, making it very dangerous to attempt to shut off the gas which is the source of the fire. The positioning of the shutoff valve at a remote location can solve this problem and applicant's U.S. Pat. No. 4,889,313 sets forth a device for accomplishing this.

Other shutoff valves which include fusible portions are shown in U.S. Pat. Nos. 5,343,884, 3,538,929, 3,165,236, and 5,004,003. Some early patents utilizing fusible links include U.S. Pat. Nos. 1,746,801, 1,658,099, 938,613, and 903,794. Each of these devices has a single fusible link typically positioned at a valve location. Fires, however, do not always cooperate and frequently burn in areas where the single fusible link of the prior art devices is not melted.

BRIEF SUMMARY OF THE INVENTION

It is an object of the present invention to provide a gas shutoff device which is capable of turning off a gas valve either manually or when a fire occurs at any of a plurality of locations.

The present invention is for an emergency fuel shutoff device for interrupting the flow of gas to a burner in the event of a malfunction. The device utilizes a normally closed spring loaded gas shutoff valve having a valve stem which when pulled out opens the valve. A cable is attached to the valve stem and exerts continuous tension on the valve stem to hold the valve in an open position. A cable termination station holds a remote end of the cable in a fixed, tensioned position. A plurality of fusible link interrupts are positioned along the cable at predetermined locations. When any one of these fusible link interrupts is melted, the tension in the cable is released and the gas valve is closed. Preferably the shutoff or tension release action initiates one or more alarms to signal the turning off of the gas valve.

DESCRIPTION OF THE PREFERRED EMBODIMENTS

Figure 1:
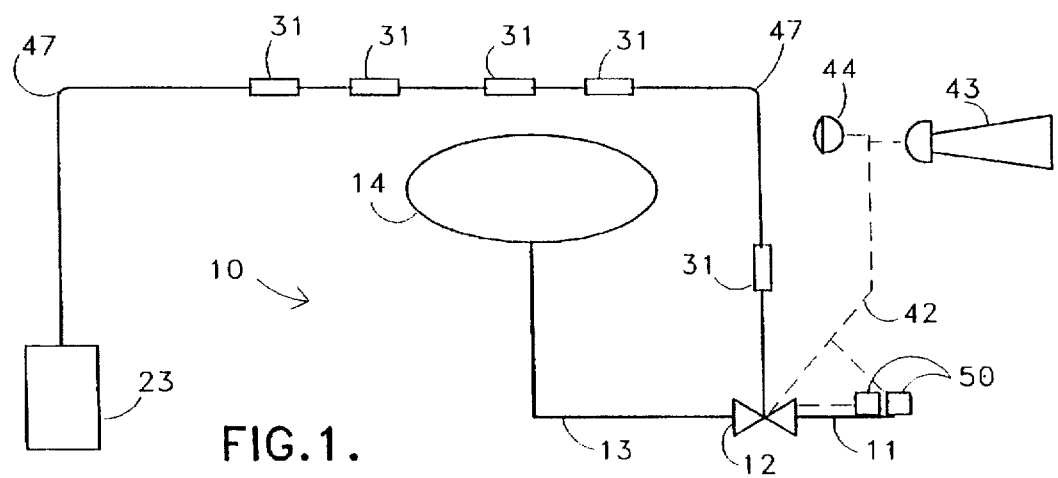
FIG. 1 is a diagrammatic view of the emergency fuel shutoff device of the present invention.
Figure 2:
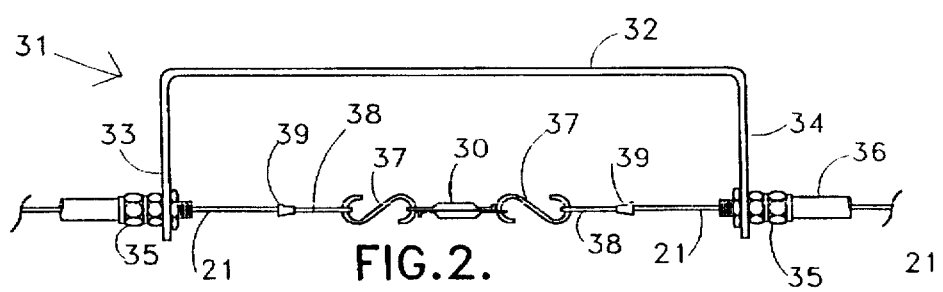
FIG. 2 is an enlarged side view of a fusible link interrupt of the emergency fuel shutoff device of FIG. 1.

The emergency fuel shutoff device is shown in schematic view in FIG. 1 and indicated generally by reference character 10. The device has a source of gas 11 which passes through a normally closed fuel shutoff valve 12. From there the gas passes through line 13 into a burner which might be a boiler, curing oven or other device.

Figure 3:
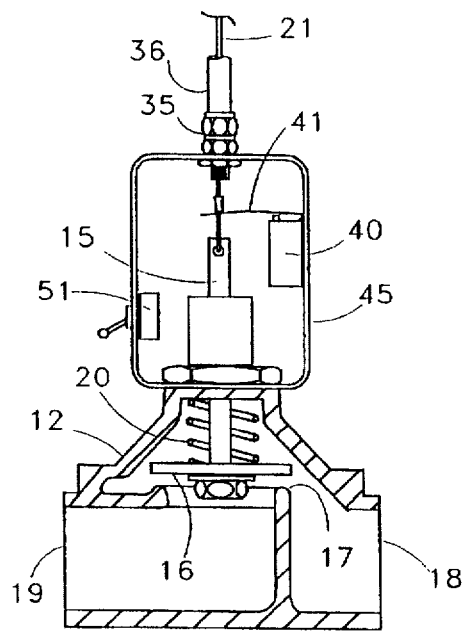
FIG. 3 is a cross-sectional view of a normally closed fuel shutoff valve and control housing.
Figure 4:
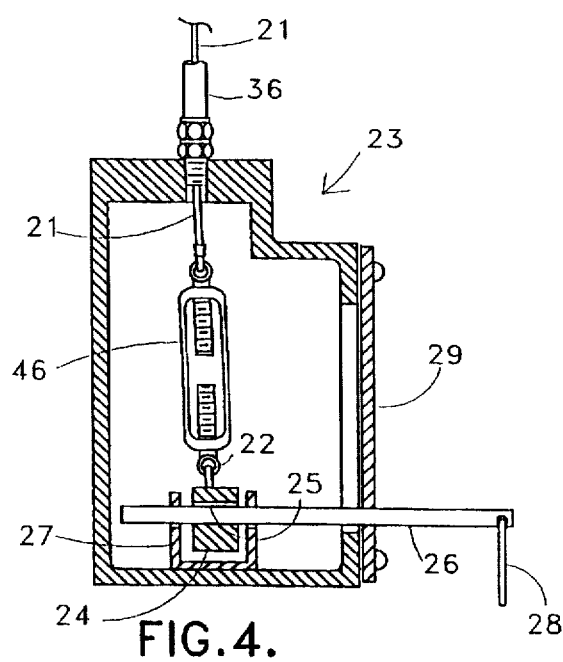
FIG. 4 is a cross-sectional view of a cable termination station.

The normally closed fuel shutoff valve 12 is shown in enlarged, but still schematic, view in FIG. 3 where it can be seen that valve 12 has a spring loaded valve stem 15 which holds valve washer 16 away from valve seat 17 to permit gas to flow from inlet 18 to outlet 19. A spring 20 urges the washer 16 toward valve seat 17 but is retained away from valve seat 17 by cable 21. Cable 21 is retained in tension at its remote end 22 which is held in cable termination station 23 shown in cross-sectional view in FIG. 4. Remote end 22 is held to a block 24 which has a hole 25 through which a pin 26 is inserted. Pin 26 is held in two openings in a U-shaped bracket 27. A pull ring 28 when pulled pulls pin 26 out of hole 25 and allows the tension in cable 21 to be released thereby causing spring 20 to press valve washer 16 against valve seat 17.

Thus, one way of releasing the tension in cable 21 is to grasp the pull-ring 28 and pull it outwardly. The device is reset by removing cover 29 and loosening turn buckle 46. This permits block 24 to loosely move into U-shaped bracket 27. Pin 26 can then be inserted through hole 25 with no tension. Next, turn buckle 46 is once again tightened placing tension back in cable 21 and opening fuel shut-off valve 12.

Figure 5:
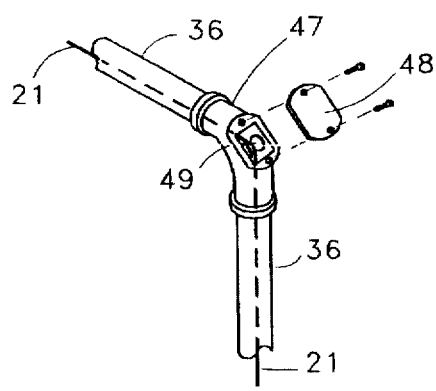
FIG. 5 is a perspective view partially broken away showing a corner pulley of the device of FIG. 1.

Applicant's U.S. Pat. No. 4,889,313 is incorporated herein by reference and shows details of the manner in which the cable is moved around the corners in the system. Thus, two lengths of hollow tubing 36 are shown in FIG. 5 held by corner fitting 47. Corner fitting 47 has a cover 48 which protects freely rotatable pulley 49 as described in more detail in applicant's U.S. Pat. No. 4,889,313.

Another way of releasing the tension in cable 21 is the melting of a fusible link 30 in fusible link interrupt assembly 31. This assembly includes a housing 32 which has ends 33 and 34 which hold fittings 35 to the end of hollow tubing 36 which surrounds and protects cable 21. Cable 21 is preferably 1/16" stainless steel stranded cable. Because the location of a potential fire is somewhat unpredictable, the assembly of the present invention places a plurality of fusible link interrupts 31 along the cable. There should be at least two of such interrupts and preferably at least three. In this way, a fire anywhere remotely close to the burner 14 will turn off the flow of gas without requiring an emergency worker to reach valve 12 or even cable termination 23 to turn off the gas.

Fusible link 30 is held by a pair of S-hooks 37 in loops 38. Loops 38 are formed by crimp type cable connectors 39. There should be at least 3" of space between cable connector 39 and the fitting 35 so that sufficient movement is provided in cable 21 to permit valve 12 to completely close.

It is also advantageous for there to be a signal either audible or visible when the gas valve is shut. A micro switch 40 has a flexible arm 41 which closes the switch when the tension in the cable is released. Switch 40 and cable fitting 35 are held by housing 45 affixed to the top of valve 12. This switch 40 may be connected through line 42 to a horn 43 or a strobe light 44 to provide a means of alerting personnel of the existence of an interrupt in the gas flow. One of the advantages of the device of the present invention is its independence from any external power source. It is not uncommon for a power source to fail or be turned off in case of a fire. In such instances it is especially important that the device of the present invention continue to be operative. The device, of course, is completely manual in the manner in which it shuts off the gas. The horn 43 and strobe light 44 are likewise powered independently by batteries 50 shown in FIG. 1. Thus, when the system is tripped and the gas valve is shut off, the horn 43 and strobe light 44 are activated. On/off switch 51 is mounted on housing 45 and permits an operator to manually turn off the horn and light by manually operating on/off switch 51.

The result is a passive safety system which is capable of turning off the flow of fuel such as natural gas or fuel oil automatically. The fusible links are positioned in a plurality of locations so that no matter where a fire is burning the gas supply is shut off. The system also may be manually shut off if desired.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. An emergency fuel shut-off device for interrupting the flow of fuel to a burner in the event of malfunction, said device comprising:

a normally closed, spring loaded fuel shut-off valve having a valve stem which opens the valve when it is pulled out but which is biased toward a closed position to provide a biased valve stem;

a cable affixed to said valve stem, said cable exerting continuous tension by the biased valve stem to hold said valve stem in an open position;

a cable termination station, said termination station including means to hold a remote end of said cable in a fixed, tensioned position said cable termination station further including a turnbuckle to adjust the length of said cable and wherein said cable termination station includes cable release means; and a plurality of fusible link interrupts positioned along said cable at predetermined locations, each of said fusible links being held in tension by the biased valve stem whereby when at least one of said fusible link interrupts is melted, the tension in the cable is released and the valve stem of the spring-loaded fuel shut-off valve is permitted to return to its normally closed position thereby shutting off any flow of fuel through said valve.

2. The emergency fuel shut-off device of claim 1 wherein each of said fusible links is supported in a housing having two ends, and a center including an opening exposing said fusible link to a potential source of heat.

3. The emergency fuel shut-off device of claim 1 wherein there are at least three fusible links.

4. The emergency fuel shut-off device of claim 1 wherein said cable termination center includes release means.

5. The emergency fuel shut-off device of claim 4 wherein said cable termination center further includes length adjusting means.

6. The emergency fuel shut-off device of claim 4 wherein said release means includes a pull-pin.

* * * * *